Feb. 9, 1937. R. W. FLINN 2,070,161
PURIFICATION OF NATURAL DEPOSITS
Filed Jan. 21, 1935
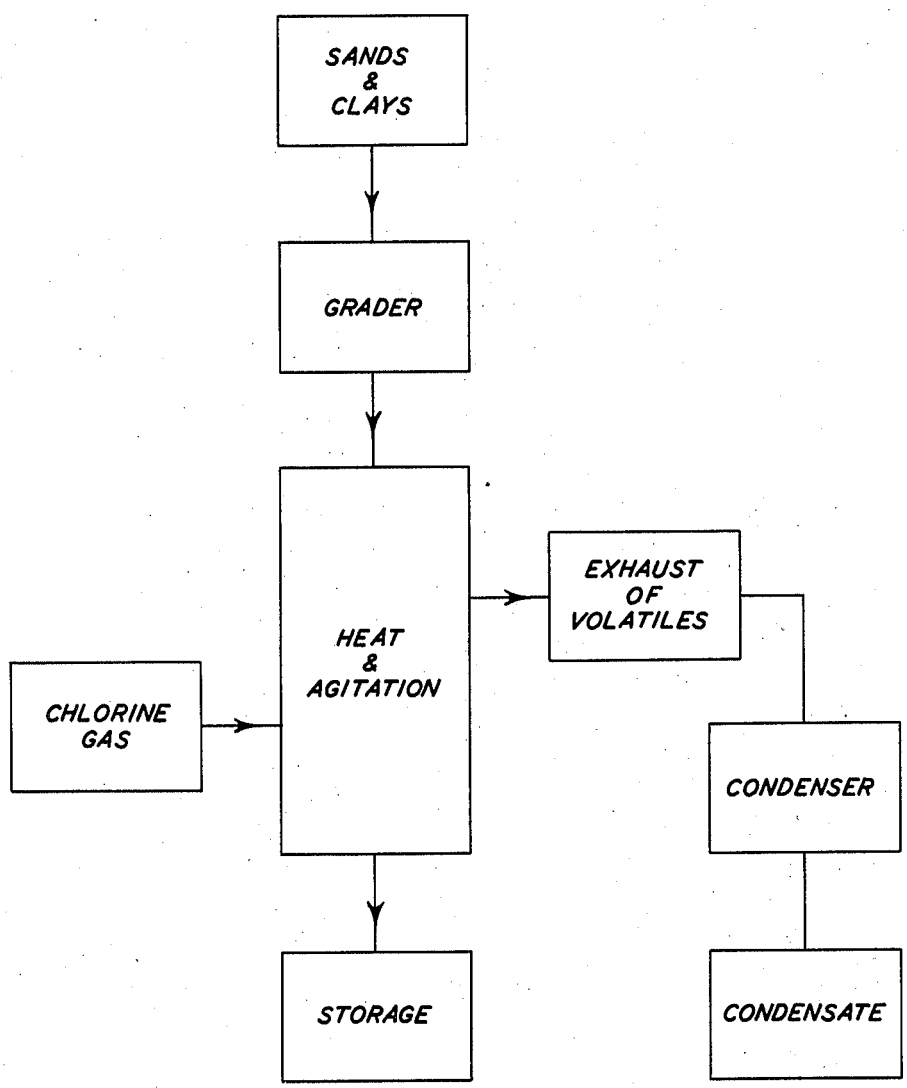
INVENTOR,
ROLAND W. FLINN.
BY
ATTORNEYS.

Patented Feb. 9, 1937

2,070,161

UNITED STATES PATENT OFFICE 2,070,161

PURIFICATION OF NATURAL DEPOSITS

Roland W. Flinn, Oakland, Calif.

Application January 21, 1935, Serial No. 2,831

1 Claim. (Cl. 252—8)

My invention relates to the purification of natural deposits and more particularly, to the purification of sands. My invention is particularly useful in the purification of silica sand for use in making of glass.

Among the objects of my invention are: To provide for the purification of silicious sands; to provide for the purification of natural deposits whereby the iron content may be greatly reduced; to provide a method of treating natural deposits to recover therefrom the greater portion of the iron content; to provide a method whereby the greater portion of the aluminum content of natural deposits may be removed; to provide a method whereby stained silicious sands may be used in the making of clear glass; to provide a method for the removal of iron stains from natural deposits such as silica sands and ceramic clays; to provide a method of treating natural sand deposits whereby the material of the deposit may be obtained in purified condition and the removed impurities collected for separate use, if desired.

Other objects of my invention will be apparent or will be specifically pointed out in the description forming a part of this specification, but I do not limit myself to the embodiment of the invention herein described, as various forms may be adopted within the scope of the claims.

The figure represents a flow sheet of a preferred method for removing iron stains from silicious sand, together with a substantial amount of any aluminum content present in the deposit.

No natural sands are entirely free from iron compounds and even the most stringent attempts heretofore attempted at purification do not succeed in completely removing all the iron present. The chief compounds of iron occurring in sands are the oxides, carbonates and sulphides, and various other complex minerals containing irons. These compounds are derived from decomposed ferruginous rocks either by direct admixture or by the compounds being dissolved by organic acids, the solution formed thereby running over, penetrating the sands, staining them, and in many cases, being later decomposed.

Iron compounds may occur in sand in three forms: (a) as a thin film coating the grains of other minerals; (b) in minute particles disseminated fairly uniformly through the sand; and (c) as larger particles gathered irregularly amongst the grains of other materials.

The chief effect of these iron compounds in sands or similar deposits is to reduce their refractoriness and to cause them to be brownish in color. The intensity of the color produced by the presence of iron is not, however, a reliable indication of the amount present, as much depends upon the condition and nature of the iron compounds and whether or not the iron is disseminated throughout the sand as specific iron particles or as a film over the grains of the sand itself. It is with this latter condition where the iron is present in the form of a stain that the instant application is concerned, as there are other methods known in the art for dealing with specific iron particles.

It is well known in the art that where a sand contains a very adherent film of iron oxide or limonite, washing will not improve it to any great extent and in the use of sand for glass manufacture, if the proportion of iron oxide is high, the sand heretofore has been completely rejected.

It is standard in the art that sands for use in the manufacture of the best glasses should not contain more than a total of 1% of these impurities, including iron, and in most cases, sand should be used with less than half of this percentage of impurity. In fact, the best quality optical glass, in order to be perfectly colorless, can only be produced from sands containing not more than .03% of iron oxide, this proportion being reduced in the final glass to .02% due to the fact that only about two-thirds of the batch composition is sand.

Iron compounds are not alone objectionable in sand to be used for making glass, but others, such as aluminum, vegetable and organic matter, are also highly objectionable.

Alumina occurs in glass sands principally as orthoclase, feldspar, muscovite clay, and alumino-silicates. The muscovite and clay may be removed fairly readily by washing; but the others cannot be removed in this manner.

In small proportions aluminum is useful in sands used for making glass of a certain quality in that it tends to invest hardness, brilliancy and strength and reduce the coefficient of expansion. The chief disadvantages are that it decreases the fusibility, increases viscosity and creates a glass which does not mix readily with others. It is, however, undesirable in optical glasses where not more than .5% of alumina should be present. On the other hand, dark glass bottles often contain as high as 4% of alumina. The instant invention is also concerned with the lowering of a higher aluminum content in a sand to a point where glass made therefrom will be perfectly satisfactory even for optical purposes.

Organic matter should not be present in sands used for glass making and while a great deal of this organic matter may be removed by washing, a certain amount of organic matter is not only not harmful to my method, but in certain cases is actually beneficial, as will be pointed out later.

Heretofore the purification of sands or similar deposits such as ceramic clays which are stained with iron, have been purified by the application of hydrochloric acid in the form of a wet treatment. It is also known in the art that sands may be mixed with common salt and sulphur and heated to redness, but neither of the two methods heretofore used is satisfactory for speedy and continuous purification of sand deposits nor have the processes heretofore used been adapted to the removal of excessive amounts of aluminum. My invention, however, provides broadly, for the continuous removal of iron stain, and for either the simultaneous or two-step removal of both iron and alumina below the minimum requirements of the making of even optical glasses.

The broad steps in my preferred method comprise the passage of washed and graded sands through a heated chamber with the continuous application of chlorine gas, meanwhile maintaining agitation of the particles until the iron combines with the chlorine to form iron chloride, which is volatile and which is exhausted from the chamber. I have found that this combination takes place when the sand is between 200 and 300 degrees Centigrade and above, and that if the temperature be raised to over 600°, the aluminum also combines with the chlorine, passing off as aluminum chloride. Both of these chlorides may be condensed by the use of suitable condensers and removed as aqueous solutions, the water coming from the moisture of the sand as originally introduced into the oven.

It has heretofore been known that aluminum oxide can be treated with chlorine, using charcoal as a catalyst. There is, however, usually sufficient organic material in the sand as introduced into the heated chamber to provide for the catalytic action, or if necessary, small amounts of carbon may be introduced into the oven as will be later described.

Specifically, I prefer to describe my process as applied to the purification of a silicious sand containing more than .03% iron in the form of a stain and from 3.7% to 40% alumina. This sand as mined is not suitable for glass manufacture. After excavation, the sand is washed and graded in accordance with the requirements of the glass industry as well known in the art, and is then passed into any suitable form of oven to be treated. I prefer, however, to use a rotary calcining oven similar to that used in the cement industry where a long tube is positioned on rollers and rotated at a slight angle so that the sand introduced at one end will gradually progress towards the lower end. The lower end is provided with one or more heating flames so that the sand is progressively heated as it passes through the oven. I also provide adjacent the flame or flames, one or more chlorine jets whereby gaseous chlorine is admitted to the rotating tube. The entrance of the sand at the high end and the outlet of the sand at the low end may be blocked or trapped in any of the manners well known in the art to prevent escape of the chlorine and compounds formed therefrom.

At a suitable location intermediately between the two ends of the tube, the tube is perforated and an exhaust ring or similar means positioned around the tube to collect the volatile compounds given off, and I prefer to conduct the gases removed from the oven through a condenser of any convenient form and to apply negative pressure to the exhaust by means of any suitable pump or like device. In order that the condenser and pump may not become clogged with sand particles and dust, I prefer to position a filter immediately adjacent the drum in the exhaust line.

As the sand progresses through the oven from the high end to the heated lower end, it is gradually heated and as it approaches 300°, the iron content of the sand combines with the chlorine to form iron chloride which, being volatile passes off through the exhaust tube and is condensed as an aqueous solution of iron chloride therein. As the sand progresses still further, and approaches 600°, the aluminum present starts to combine with the chlorine and forms aluminum chloride, which is also volatile and is recovered in the condensers as aluminum chloride. The condensate in this case will contain both the iron and aluminum chloride, and it may be removed and treated further if desired to recover iron or aluminum or both as by-products.

If desired, however, the iron and aluminum may be collected separately by the use of two exhaust lines, one on each side of a division in the drum by a trap through which the sand can pass. This division is made between the portions of the drum below 300° and that portion of the drum above 300°, so that relatively pure separate condensates of iron chloride and aluminum chloride may be obtained. This procedure, however, is purely optional and depends upon the means and method by which the metals are to be recovered from the condensates.

The amount of iron remaining in the sand is less than .03% after treatment with the chlorine gas and the amount of aluminum remaining will of course depend upon the original amount in the sand, the length of time the sand is heated to the higher temperatures, and to the final temperature to which the sand is subjected at the heated end of the rotating tube.

The sand as obtained by my process is almost pure white, is perfectly satisfactory for glass mixes and my process is such that the residual impurities can be accurately controlled by adjusting the length of the tube and the degree of heat, as pointed out above. The entire process being a continuous one, the sand can be treated at a very low expense, thus making available for the use of glass factories huge deposits of sand which have heretofore been rejected because of the impurities therein.

It should also be pointed out that should any organic matter be present in the sand, it will be carbonized by the heating process to provide the catalyst required for the combination of the chlorine with the aluminum. If sufficient organic matter is not present in the sand as introduced, the heating flames which are positioned at the lower end of the oven can be adjusted to supply to the interior of the tube a sufficient amount of carbon to thoroughly and completely aid the combining of the two materials.

It also is very simple to make the process completely regenerative if the refining of the iron and aluminum chlorides is done in such a manner that the chlorine can be removed from the condensate and returned to the jets. My preferred process contemplates such regeneration.

Substantially the same apparatus will be used when surrounding clays are being treated, or in fact any natural deposits where the impurities, particularly iron, in the form of stains, exist on the outside of the particles.

It will be obvious to those skilled in the art that my process can be accomplished by the use of the assembly of many types of suitable machines now in use in the art for other purposes, the apparatus as outlined above being exemplary only.

I claim:

The method of purifying natural deposits in finely divided form in an oven which comprises passing said material continuously through said oven, passing a continuous stream of chlorine gas through said oven, agitating said material during passage through said oven to obtain intimate mixture of gas and material particles, applying a heat gradient to said streams through said oven whereby different combinations of the gas and impurities in said oven will occur in different locations within said oven, and separately removing said different combinations.

ROLAND W. FLINN.